Patented Feb. 2, 1937

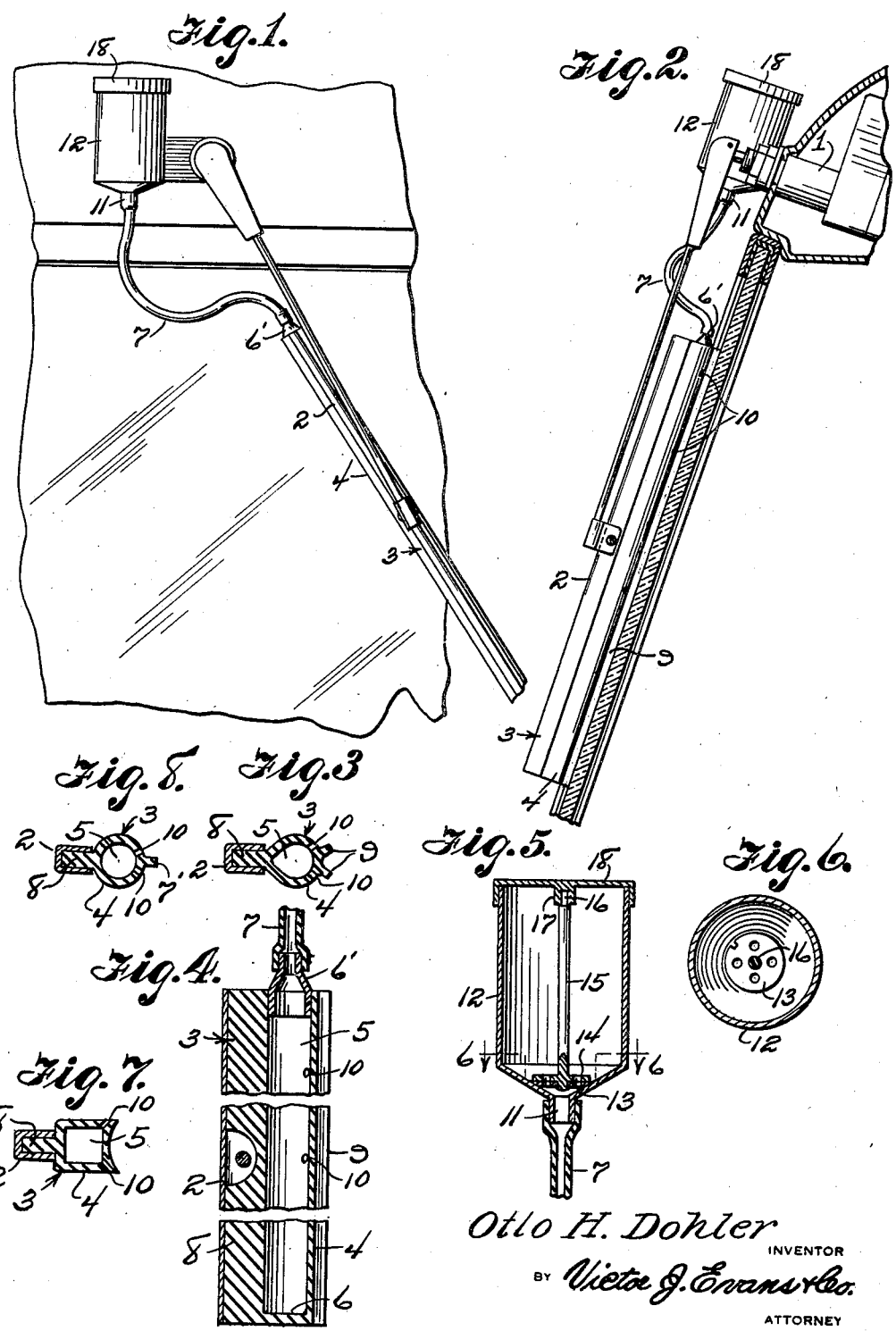

2,069,699

UNITED STATES PATENT OFFICE 2,069,699

WINDSHIELD WIPER BLADE

Otto H. Dohler, Elmwood Park, Chicago, Ill.

Application October 9, 1935, Serial No. 44,297

1 Claim. (Cl. 15—250)

This invention relates to windshield wiper blades and has for the primary object the provision of a device of this character which may be readily adapted to a conventional type of blade holder and is so constructed that during its operation of cleaning a windshield glass it will supply an anti-freeze substance thereto to prevent ice, snow and the like from freezing or accumulating on the glass of a windshield.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating a windshield wiper equipped with my invention.

Figure 2 is a side elevation, partly in section, illustrating the same showing its asociation with the glass of a windshield.

Figure 3 is a transverse sectional view showing a wiper blade constructed in accordance with my invention and showing it adapted to a conventional type of holder.

Figure 4 is a fragmentary vertical sectional view illustrating the blade and its connection with a supply tube.

Figure 5 is a fragmentary vertical sectional view illustrating a supply reservoir.

Figure 6 is a sectional view taken on the line 6—6 of Figure 5.

Figure 7 is a transverse sectional view illustrating a modified form of my invention.

Figure 8 is a transverse sectional view illustrating another modified form of my invention.

Referring in detail to the drawing, the numeral 1 indicates a conventional type of windshield wiper and Figures 1 and 2 showing the application of the wiper to a motor vehicle windshield. The wiper includes the conventional type of blade holder 2 to which is adapted a blade 3 consisting of a body 4 having formed therein a chamber 5 closed at one end, as shown at 6, and receiving in its opposite open end a fitting 6' to which a flexible pipe 7 is connected. The body 4 upon one side thereof has a rib or flange 8 gripped by the holder 2 and upon the opposite side of the body are formed diverging ribs 9 extending the full length of the body and which during operation of the wiper contact with the glass of the windshield. Ports or openings 10 are formed in the body and are located adjacent to the ribs 9 and have communication with the chamber 5. The supply tube 7 is connected to an outlet 11 of a supply tank or reservoir 12 suitably mounted with respect to the windshield wiper 1, as shown in Figures 1 and 2. The tank or reservoir is adapted to contain an anti-freeze solution or substance and has located therein and adjacent to the discharge outlet 11 a valve 13, the ports of which are controlled by a valve element 14 in the form of an apertured disc and having a stem 15 extending upwardly in the tank or reservoir. The free end of the stem 15 has angularly related faces 16 to engage angular faces of a socket element 17 formed on a cap or closure 18 of the tank or reservoir. By turning the closure or cap the valve may be opened or closed for the purpose of regulating the flow of the anti-freeze medium to the chamber 5 of the blade. The anti-freeze medium may seep from the chamber onto the glass by way of the perforations or ports 10 so that during the operation of the blade over the glass the anti-freeze solution will be applied thereto to prevent ice, snow or the like from accumulating on the glass.

Any type of anti-freeze solution may be employed in the device such as glycerine or salt and when the latter is employed it will fill the chamber 5 and the rain or moisture on the glass will pass into said chamber by way of the ports and form the salt into a solution which may pass back onto the glass by way of said ports.

The body 4, as shown in Figure 3, is substantially of cylindrical shape, however, the body may be made of other shapes such as substantially rectangular shape, as shown in Figure 7.

As shown in Figure 8, the body may be provided with a single rib 7' with the ports located at opposite sides thereof.

Having described the invention, I claim:

A windshield wiper blade comprising an elongated body mounted for oscillating movement and having a chamber extending substantially the full length thereof and opening outwardly through one end with said end of the body disposed uppermost to permit depositing in the chamber dissoluble anti-freeze substance, spaced ribs formed on the exterior of the body and paralleling the latter to contact a glass of a windshield and act to remove water therefrom during oscillation of the body with the water being dragged over the glass, causing banking of the water first at one side of the ribs and then at the opposite sides thereof, said body having ports for the chamber located adjacent to and at the outer sides of the outer ribs so that the water when banked by said ribs will enter the chamber to dissolve the anti-freeze substance and pass from said chamber during the non-banking of the water by the ribs and thereby deposit onto the ribs and thence onto the glass covering a substantial area of the latter to prevent freezing of water on the glass within and adjacent to said area.

OTTO H. DOHLER.